United States Patent [19]

Haar et al.

[11] 4,196,415
[45] Apr. 1, 1980

[54] AUTOMOTIVE TURN SIGNAL FLASHER UNIT HAVING INTEGRAL ACOUSTIC SIGNAL MEANS

[75] Inventors: Gerhard Haar, Leinfelden; Josef Swoboda, Bietigheim-Bissingen, both of Fed. Rep. of Germany

[73] Assignee: ITT Industries, Inc., New York, N.Y.

[21] Appl. No.: 742,249

[22] Filed: Nov. 16, 1976

[30] Foreign Application Priority Data

Dec. 24, 1975 [DE] Fed. Rep. of Germany ....... 2558717

[51] Int. Cl.$^2$ ............................ B60Q 1/34; B60Q 5/00
[52] U.S. Cl. ........................................ 340/75; 340/88; 340/326; 340/329; 340/384 E
[58] Field of Search ............... 340/326, 331, 332, 328, 340/329, 81 R, 84, 88, 75, 371, 384 E

[56] References Cited

U.S. PATENT DOCUMENTS

| | | | |
|---|---|---|---|
| 2,775,751 | 12/1956 | Gordon et al. | 340/88 |
| 2,830,284 | 4/1958 | Keegin | 340/75 |
| 2,896,190 | 7/1959 | Gallaro et al. | 340/88 |
| 3,329,868 | 7/1967 | Domann et al. | 340/81 R |
| 3,343,123 | 9/1967 | Troesh | 340/75 |
| 3,810,086 | 5/1974 | Bemsel et al. | 340/75 |
| 3,810,149 | 5/1974 | Miller et al. | 340/384 E |
| 3,858,177 | 12/1974 | Kugelmann et al. | 340/81 R |

*Primary Examiner*—John W. Caldwell, Sr.
*Assistant Examiner*—James J. Groody
*Attorney, Agent, or Firm*—James B. Raden; William J. Michals

[57] ABSTRACT

An automotive turn-signal flasher unit in which an astable transistor multivibrator periodically switches a flashing circuit through a switching relay is disclosed. The switching relay is formed as an electro-mechanical buzzer and thereby simultaneously provides the additional function of a separate acoustical signal source such as a buzzer.

1 Claim, 2 Drawing Figures

AUTOMOTIVE TURN SIGNAL FLASHER UNIT HAVING INTEGRAL ACOUSTIC SIGNAL MEANS

BACKGROUND OF THE INVENTION

This invention concerns a flasher unit comprising an astable transistor multivibrator which can periodically switch on and off the flashing circuit through a switching relay.

Various circuit arrangements are known the multivibrator of the flasher unit of which is also used for giving other supervising signals. Thereby own control circuits for the multivibrator are provided and into the control circuits separate pilot lamps are integrated. This multiple use of the multivibrator, however, in all supervised electric circuits entails flickering signals of the same switching frequency as the flashing signals of the direction indicating circuits.

Moreover in an automotive vehicle also other supervising circuits are provided which are giving a signal to be heard through an acoustical signal generator. Therefore a separate acoustical signal generator as a rattle, buzzer or the like is necessary.

It is an object of the invention to modify a flasher unit of the type as described above in a way that it can also give acoustical signals for supervising circuits without an additional acoustical signal generator.

SUMMARY OF THE INVENTION

This is achieved according to the invention on the one hand in that the switching relay is formed as an electromechanical buzzer which may be actuated through an own break contact and a control make contact in a self-interruption circuit and on the other hand that a multivibrator is used the switching rate of which increases with decreasing load and in that the multivibrator may be loaded highly resistively by way of a control make contact. In both cases the switching relay is operated with a substantially higher switching rate than during the flashing process of the direction indicator and thereby causes an acoustical signal well to be heard. Thereby the switching relay of the multivibrator takes over the function of the separate acoustical signal generator, whereby in the first case the frequency of the indicating signal is defined by the natural frequency of the switching relay and in the second case by the high switching rate of the little loaded multivibrator.

The control of the switching relay designed as a buzzer by a supervising circuit is achieved in that the switching contact of the switching relay is designed as a changeover contact, the changeover spring of which is connected to the feed potential through a current supervising resistor, the make contact spring of said changeover contact is connected to the flashing circuit and to the break contact spring of which the control make contact is connected, the free connecting spring of which is connected to the terminal of the switching relay said terminal being connected to the output transistor of the multivibrator.

In addition to the acoustical signal in any case also an optical signal for the buzzer operation can be branched. For this purpose, a pilot lamp may be connected to the terminal of the multivibrator through a further control make contact.

BRIEF DESCRIPTION OF THE DRAWING

The invention is now described in detail by way of embodiments shown in the accompanying drawing, in which.

DETAILED DESCRIPTION

Figure 1:
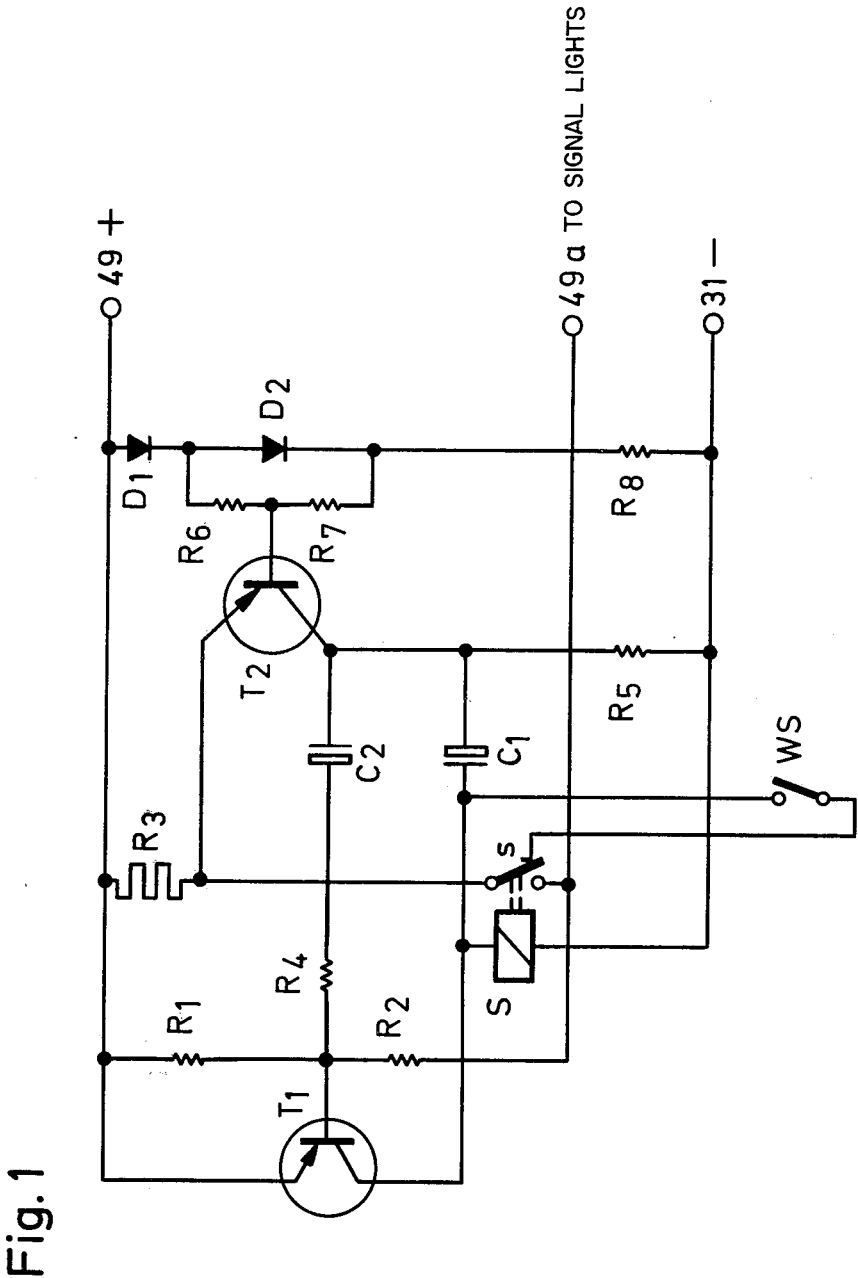
FIG. 1 is a circuit diagram of an electric flasher unit according to the principles of the present invention, the switching relay of which further functions as a buzzer and which can be directly controlled; and, FIG. 2 is a circuit diagram of an alternate embodiment of a flasher unit, including a load dependent multivibrator and wherein the switching relay may be controlled by a highly resistively control circuit.

The flasher unit is connected to a d.c. feed voltage, or source of operating potential, of corresponding polarity through the terminals 49+ and 31−. The terminal 49a leads to the direction indicator switch, thereby switching on the flasher lamps, which are fixedly connected to the potential 31−, in accordance with the vehicle requirements.

In the inoperative condition the terminal 49a is not supplied. The contact s of the switching relay S takes the position shown in the drawing. Because no current flows through the measuring resistor R 3, there is also no drop in voltage thereon. The transistor switching stage T2 receives no blocking voltage and is controlled by the control voltage tapped from the voltage divider. Said voltage divider contains a series-connected diode D1, a diode D2 and a resistor R 8. Of the drop in voltage across the diode D2, only a part determined by the low voltage divider comprising the resistors R6 and R7, is superposed on the drop in voltage on the diode D1 and used as a control voltage. In this manner it is possible to adjust the control voltage exactly to the desired threshold value and to adapt it optimally to the characteristics of the diodes D1 and D2. Thereby the control voltage is dependent on the applied supply voltage and the temperature, since these diodes D1 and D2 are voltage and temperature-dependent resistors. As is well-known the diode resistors have a negative temperature co-efficient as do the transistors used in a flasher unit. In this manner the response threshold of the transistor switching stage can be adapted to the switching characteristic of the voltage and temperature-dependent multivibrator, so that a voltage and temperature compensation is obtained and the flasher unit operates reliably in a comparatively large temperature and voltage range. Thereby the function of the transistor switching stage as a current supervising means is uneffected and the failure of a flasher lamp is still clearly recognized.

If the transistor switching stage T2 is conductive the terminal of the time-determining capacitor C2 of the single transistor multivibrator not facing the base of the transistor T1 is connected to the terminal 49+ via the collector-emitter-junction of the transistor switching stage T2 and the measuring resistor R3, to which also the base of the transistor T1 and the terminal of the capacitor C2 facing it are applied. The capacitor is therefore discharged in the initial condition.

If the terminal 49a is loaded, a control circuit for the transistor T1 is closed for the time being through the connected flasher lamps and the resistors R1, R2 and R4. The transistor T1 becomes conductive and begins the pulsing operation. The switching relay S responds and the contact s switches the flashing circuit to the potential 49+. If the flashing circuit is functioning correctly the drop in voltage on the measuring resistor R3 is so big that the emitter blocking voltage exceeds the base control voltage of the transistor switching stage T2. The transistor T2 becomes non-conductive, so that the potential 31— charges the capacitor C2 through the resistor R5. As long as the charging process continues, the transistor T1 is kept conductive by the drop in voltage occurring on the resistor R1. The conductive transistor T1 switches on the switching relay S which remains energized until the charging process of the capacitor C2 is terminated and the transistor T1 becomes non-conductive again. During the pulsing time the switching contact s switches the potential 49+ through the resistors R2 and R4 to the base of the transistor T1 which is blocked thereby when no more charging current is flowing through the capacitor C2.

If a flasher lamp fails in the flasher circuit, the drop in voltage on the measuring resistor R3 is no longer sufficient to block the transistor switching stage T2. The transistor T2 remains conductive during the pulsing phase and thus the charging current for the capacitor C2 is reduced by the voltage divider comprising the resistors R3 and R5. The consequence of this is that the charging action is concluded more rapidly, i.e., the pulsing time is shorter. The following interval time, which ensues due to the discharge of the capacitor C2 through the resistors R1, R4 and R3 and the conductive transistor T2, is also shorter, since the charging voltage from which the discharge starts, is lower. The switching frequency of the multivibrator is therefore increased. Thereby the normal operation of the transistor switching stage does not alter, if the control voltage is derived from such a voltage divider and it compensates for changes in the multivibrator due to variations of the voltage and temperature.

The advantage of this compensation arrangement in the transistor switching stage T2 is that, even if the flashing circuit is out of order, the transistor T2 is briefly controlled by the switch-on current in the flashing circuit and thus a voltage pulse is supplied to the multivibrator, so that when actuated it starts immediately with a pulse phase.

The capacitor C1 is an electrolytic capacitor. The switching relay S is designed as an electro-mechanical buzzer which may have a natural frequency of 50 Hz and more. If the control make contact ws which can be part of a supervising circuit is closed, the switching relay S is operated in self-interruption circuit through the resting side of its changeover contact s and therefore is energised in the rhythm of its normal frequency and switched off again. The noises occuring thereby are observed as an acoustical signal. The switching relay S may therefore in addition to the switching function during flasher operation also be used as an acoustical signal generator for other supervising circuits.

Figure 2:
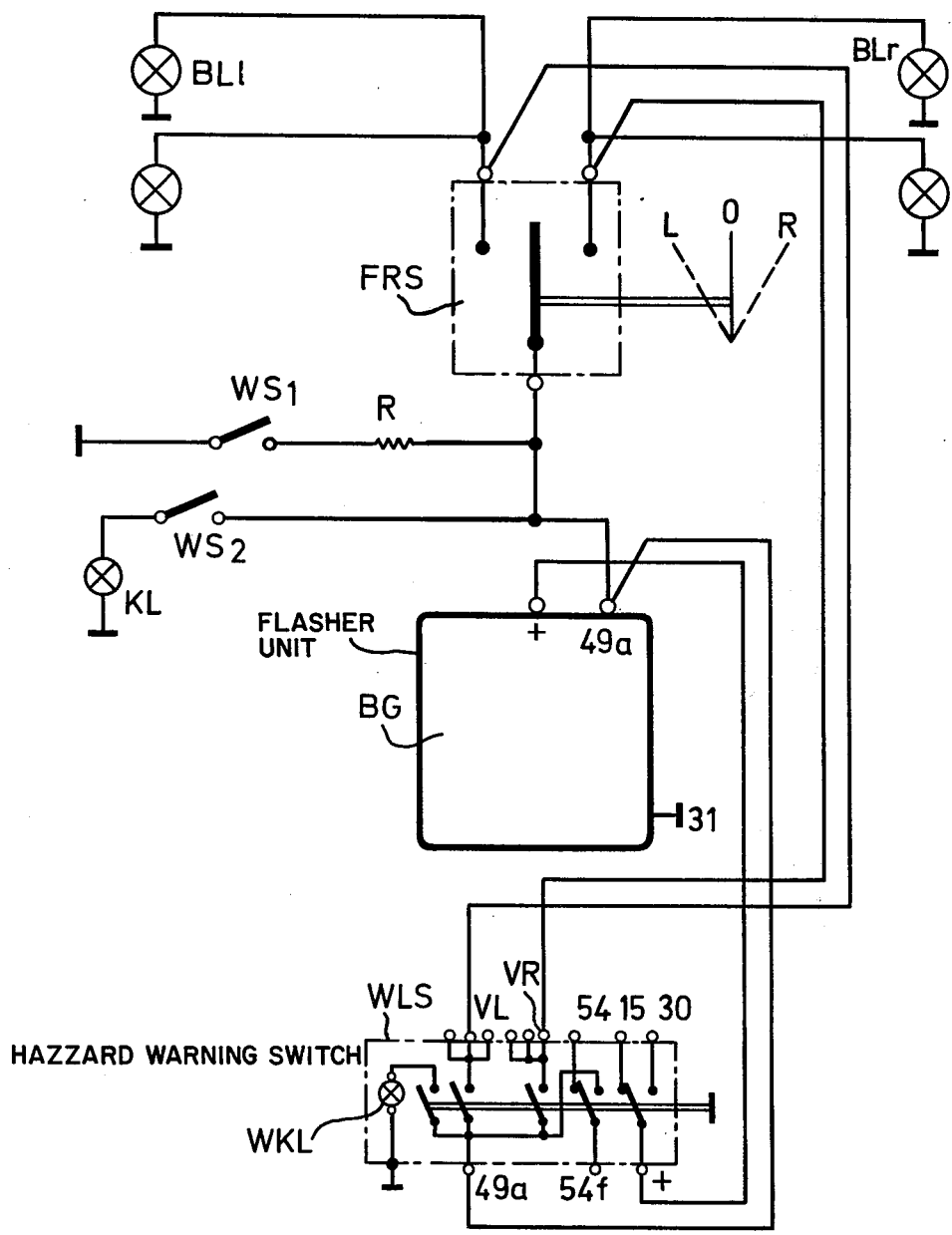

The embodiment according to FIG. 2 works similarly, whereby the astable multivibrator with the switching relay is shown in the drawing as flasher unit BG. This flasher unit BG controls the flasher lamps BLl or BLr separated to the sides of the vehicle through its terminal 49a and the direction indicator switch FRS. The direction indicator switch FRS is thereby switched into the operating position L or R from the center off position O.

The flasher unit can also be actuated through the hazard warning switch WLS, whereby the contacts of said hazard warning switch WLS are connecting all flasher lamps BLl and BLr to the terminal 49a of the flasher unit BG, as can be seen from the terminals VL and VR as well as 49a of the hazard warning switch WLS. Besides the hazard warning pilot lamp WKL is switched on.

The switching frequency of the multivibrator is small, when the flasher unit is under load during flasher or hazard warning operation and comes to only a few cycles per second.

If the control operating contact WS1 is closed, the flasher unit BG depending on the load is loaded with the highly resistive or high value resistor R. The multivibrator in the flasher unit begins to swing, but with a substantially higher frequency. A pilot lamp KL can be connected for example by way of manual switch contacts WS2, to the terminal 49a of the flasher unit BG, so that an optical signal can also be received. The multivibrator may also be switched on through WS2 and the pilot lamp alone.

If the multivibrator is arranged in such a manner, it is used in dependence on the load for giving flasher or hazard warning signals through the flasher lamps and also for the control of the switching relay as an acoustical signal generator. Additionally, a separate signal generator for the acoustical signals for supervising of further circuits is avoided.

What is claimed is:

1. A directional signal flasher device for automotive vehicles comprising, in combination:
    an astable multivibrator transistor oscillator for coupling between a source of operating potential and a point of reference potential with respect to said operating potential, said oscillator being selectively further coupled to an external flasher lamp, and said oscillator being responsive to the current coupled through said oscillator wherein said oscillator provides a pulsating output signal at an output thereof when the level of said current exceeds a given value;
    a mechanical switching relay having an energizing coil and a normally open set of contacts said normally open set of contacts being coupled between said source of operating potential and said external flasher lamp and said coil being coupled between said output of said oscillator and said point of reference potential and responsive to said output signal to provide a contact closure in accordance with said output signal for controlling said external flasher lamp;
    wherein said switch relay further comprises an integral electro-mechanical buzzer which generates an acoustical signal during the operation of said relay; and,
    wherein said relay further includes a normally closed set of contacts and means for selectively serially coupling said normally closed contacts between said coil and said source of operating potential wherein said relay is operated in a selfinterrupting mode when said normally closed contacts are coupled to said source of operating potential.

* * * * *